(No Model.)
L. BREGHA.
PRESERVING APPARATUS.
No. 457,471. Patented Aug. 11, 1891.
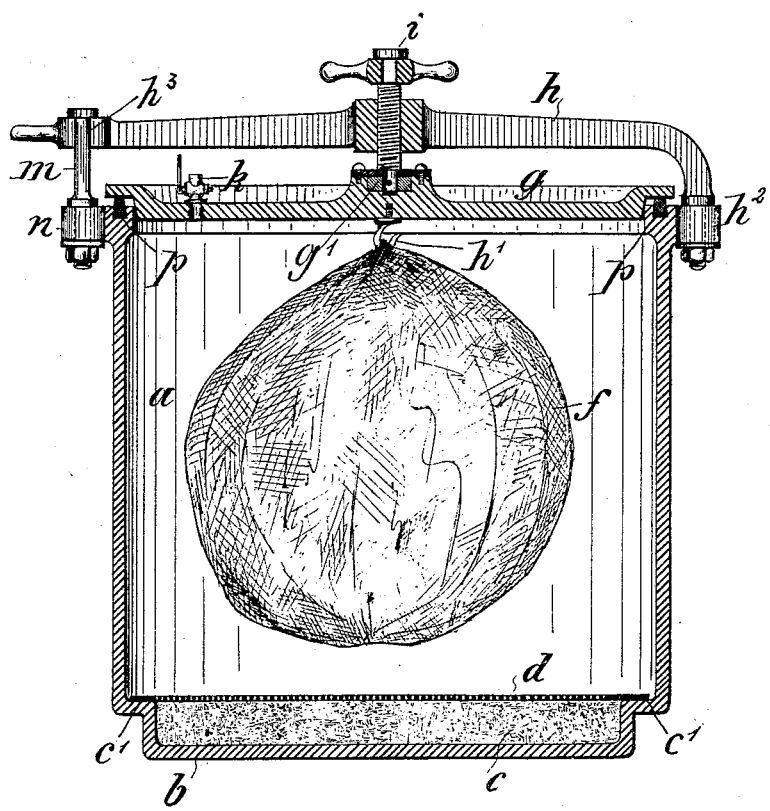
Witnesses
Ella S. Johnson
P. H. Sommers
Inventor
Leopold Bregha

UNITED STATES PATENT OFFICE.

LEOPOLD BREGHA, OF OBER DÖBLING, NEAR VIENNA, ASSIGNOR OF ONE HALF TO FRANZ BREZA, OF KREMS-UPON-DANUBE, AUSTRIA-HUNGARY.

PRESERVING APPARATUS.

SPECIFICATION forming part of Letters Patent No. 457,471, dated August 11, 1891.

Application filed January 21, 1891. Serial No. 378,544. (No model.)

*To all whom it may concern:*

Be it known that I, LEOPOLD BREGHA, engineer, a subject of the Emperor of Austria-Hungary, residing at Ober Döbling, near Vienna, in the Province of Lower Austria, in the Empire of Austria-Hungary, have invented certain new and useful Improvements in Apparatus for Preserving Articles of Food; and I do hereby declare the following to be a full, clear, and exact description of the invention, such as will enable others skilled in the art to which it appertains to make and use the same, reference being had to the accompanying drawing and to letters of reference marked thereon, which form a part of this specification.

The invention relates to the preservation of articles of food, and more especially to that class of food-products which contain protein; and it consists in an improved process of and in an apparatus for the preservation of food products of the class referred to. The preservation in a fresh state of articles of food containing protein—such as flesh or fish—is based upon the action of the vapors of glacial acetic acid on the albumen, in that the latter when exposed to such vapors becomes coagulated and forms a coating impermeable to atmospheric air and uninfluenced by the micro-organisms that are the primary cause of the destruction of such articles.

I am aware that glacial acetic acid has heretofore been used in the preservation of articles of food by exposing the same to the action of the vapors of said acid; but this operation has, so far as I know, been conducted in the open atmosphere, so that the influence of the micro-organisms in the air is not effectually avoided before coagulation of the albumen can take place. Articles of food, when treated as described, are liable to contain the germs of destruction, so that such articles will in a comparatively short time become unfit for consumption.

I am also aware that perishable food has heretofore been subjected to the action of such gases as may be termed "non-supporters of combustion," such as hydrochloric-acid gases or carbonic-acid gases, or a combination of them; also the gases of acetic acid and pyroligneous acid, with or without an admixture of air. Experience has, however, demonstrated that such gases are not adapted to coagulate the surface albumen to such an extent as to form a coating that is impermeable to atmospheric air or that is not attacked by insects.

My improvement consists in subjecting articles of food to the action of the vapors of glacial acetic acid under occlusion of atmospheric air until the albumen upon the surface is sufficiently coagulated to form a coating impermeable to atmospheric air and uninfluenced by the micro-organisms therein contained.

In the accompanying drawing I have shown an apparatus in vertical transverse section designed by me for the carrying out of my process, and in said drawing $a$ is a vessel, the bottom $b$ of which is constructed to form a well or receptacle $c$, of less diameter than the vessel $a$, thereby providing an encompassing seat or bearing $c'$ for a perforated false bottom $d$. The well is filled with an absorbent—as, for instance, felt, sponge, or like substances that will absorb comparatively large quantities of a liquid—and said absorbent is saturated with glacial acetic acid. The cover $g$ of the vessel $a$ has an exhaust-valve or stop-cock $k$ and seats upon a suitable packing $p$, that is secured in a groove formed in the upper face of the vertical wall of the vessel $a$, so as to form a tight joint and to hermetically close the said vessel. The cover $g$ is further provided with a hook or hooks $h'$, from which the article to be treated is suspended, and with a bearing $g'$ for the reception of a tightening or pressure screw $i$, that works in a threaded bearing in a lever or cross-bar $h$, one end of which is pivoted to the vessel $a$, as at $h^2$, so that the said lever may be turned out of the way for the removal and application of the said cover. The other end of the lever $h$ is provided with a vertical groove or recess $h^3$ for the accommodation of a retaining-bolt $m$, secured in a sleeve-bracket $n$ on the vessel $a$.

In practice the article or articles may be suspended from the hook or hooks $h'$, or they may be inclosed in an open-mesh fabric—as, for instance, in netting $f$, or a gauze or like open-mesh fabric—and suspended from the hook $h'$ on the under side of the cover, which is then seated or applied to the packing and screwed down tight by means of the lever $h$ and screw $i$. Before the cover is placed on the vessel the absorbent is saturated with glacial acetic acid, and after the vessel is hermetically closed the stop-cock $k$ is opened, so that the vapors from the acid may drive out the atmospheric air contained in the vessel, and when such vapors issue from said stop-cock the air will have been driven out, when said stop-cock is closed and the article allowed to remain under the influence of the glacial-acetic-acid vapors exclusively until the surface albumen has been coagulated, when it can be removed and kept for an indefinite time without further treatment. The time of exposure of the articles will necessarily depend upon the area or surfaces to be exposed to the fumes or vapors of the acid, and will therefore vary accordingly.

Having thus described my invention, what I claim is—

An apparatus for preserving articles of food, which consists of a vessel provided with a well for the reception of an absorbent material, a false perforated bottom covering said well, a cover provided with means for suspending the meat or fish therefrom and with an exhaust-valve $k$, and a central step for a tightening-screw, in combination with the cross-bar $h$, pivotally connected with the vessel at one end, a locking device for locking the other end of said bar to the vessel, said cross-bar being provided with a central interiorly screw-threaded bearing and the screw $i$, stepped in the cover and working in said bearing, and a packing interposed between the lid and vessel, for the purpose set forth.

In testimony whereof I affix my signature in presence of two witnesses.

LEOPOLD BREGHA.

Witnesses:
W. B. MURPHY,
A. JOHLESSING.